(12) United States Patent
Hawkins et al.

(10) Patent No.: US 6,264,831 B1
(45) Date of Patent: Jul. 24, 2001

(54) INTEGRATED FUEL FILTER AND FUEL PUMP ASSEMBLY

(75) Inventors: Charles W. Hawkins, Sparta; Zemin Jiang, Cookeville, both of TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/416,186

(22) Filed: Oct. 11, 1999

(51) Int. Cl.$^7$ ................................................ B01D 35/26
(52) U.S. Cl. ......................... 210/86; 210/249; 210/313; 210/416.4; 210/436; 210/438; 210/450; 210/454
(58) Field of Search ........................ 210/416.4, 436, 210/438, 441, 442, 450, 454, 472, 416.1, 416.5, 435, 86, 249, 313; 417/313

(56) References Cited

U.S. PATENT DOCUMENTS

| | | | |
|---|---|---|---|
| 2,584,551 | * 2/1952 | Chambers et al. | 210/442 |
| 2,742,155 | * 4/1956 | Sather | 210/442 |
| 3,000,467 | * 9/1961 | Bowers | 210/436 |
| 3,082,875 | 3/1963 | Korte | 210/416 |
| 3,237,770 | * 3/1966 | Humbert, Jr. | 210/442 |
| 3,389,801 | 6/1968 | Sieger | 210/135 |
| 4,502,955 | 3/1985 | Schaupp | 210/149 |
| 5,085,769 | * 2/1992 | Klausen et al. | 210/454 |
| 5,643,446 | 7/1997 | Clausen et al. | 210/184 |
| 5,833,847 | * 11/1998 | Adriaenssen | 210/442 |
| 5,855,772 | 1/1999 | Miller et al. | 210/86 |
| 5,876,599 | 3/1999 | Sylvester et al. | |
| 5,958,237 | 9/1999 | Cort et al. | 210/416.4 |

FOREIGN PATENT DOCUMENTS

| | | |
|---|---|---|
| 8-189433 | 7/1996 | (JP). |
| 11-173231 | 6/1999 | (JP). |
| WO 93/01847 | 2/1993 | (WO). |

* cited by examiner

Primary Examiner—Matthew O. Savage
(74) Attorney, Agent, or Firm—Woodard, Emhardt, Naughton Moriarty & McNett

(57) ABSTRACT

An integrated fuel filter and fuel pump assembly with a water separation capability includes a fuel filter housing and a fuel filter element placed within the fuel filter housing. The fuel filter housing includes an outer surface with a connection interface for a fuel pump. This connection interface includes a fuel inlet port and mounting provisions for threaded fasteners. The fuel pump which completes the integrated assembly includes a fuel inlet and a fuel exit which is directly connected to the flow inlet of the housing. Further, the fuel pump is directly mounted to the outer surface of the housing in a unitized-type of arrangement. The upper endplate for the filter element is enlarged so as to extend beyond the outer diameter of the filter element and additional serve as a closing lid for the housing. A standpipe is mounted into the base of the housing and a knob, which is threadedly received by the upper end of the standpipe, provides the clamping mechanism for pressing the upper endplate tight against the upper end of the housing in order to complete the sealed interface.

23 Claims, 8 Drawing Sheets

INTEGRATED FUEL FILTER AND FUEL PUMP ASSEMBLY

BACKGROUND OF THE INVENTION

The present invention relates in general to the design and construction of a fuel filter and the integration of a fuel pump with the fuel filter. More specifically the present invention relates to the enhancement of a fuel filter design by adding user-friendly features and beneficial performance features. The integration of the fuel pump is configured so as to maximize the versatility of the compatible pump and filter combinations.

Some of the benefits of integrating the fuel filter and fuel pump into a single assembly is to reduce the number of interfacing components, reduce the number of connections, and reduce the overall space requirements. When the fuel filter and fuel pump are separately packaged and assembled into the engine, each component requires its own mounting provisions and connection ports and fittings and its own interconnecting conduits. The space requirements within the vehicle engine to separately position and mount the two components are greater than when the fuel pump is directly integrated into combination with the fuel filter housing. When these two separate components are installed as separate items, more time is required in order to perform the mounting steps and the interconnecting steps for the various flow lines and conduits.

The concept of "integration" as used herein refers to the unitizing of the fuel pump into or onto the fuel filter housing. This is achieved by configuring the unitary casting used for the filter housing with suitable mounting provisions for the fuel pump. In addition to the inclusion of mounting provisions for the fuel pump as part of the filter housing, the fluid connection between the pump and the filter housing is direct (i.e., contiguous). As a result of this direct connection, there is no need to provide or use any additional fluid conduits in order to separately connect the fuel outlet of the fuel pump to the fuel inlet of the filter housing. As indicated, this direct connection eliminates the need for separate interfacing conduits and reduces the overall space requirements.

The integration of the fuel pump with the fuel filter can be accomplished in one of two primary ways. Considering the filter housing as a unitary casting, the fuel pump can be positioned within the housing by enlarging the housing to accommodate both the fuel filter and the fuel pump. This approach is disclosed by U.S. Pat. No. 5,958,237, which issued Sep. 28, 1999 to Cort, et al. The other primary way of integration corresponds to the present invention wherein the fuel pump is mounted directly to the outer surface of the fuel filter housing so as to create a unitized, integrated, single assembly.

One of the advantages of the integration approach of the present invention is the afforded versatility for the selected fuel pump. When the fuel pump is directly mounted to the exterior of the fuel filter housing, the size, shape, and style of pump can be changed without affecting the filter or the housing so long as the mounting interface and the fuel inlet/outlet connection remain compatible.

The exterior mounting also enables a quick and efficient exchange or replacement of the fuel pump without having to open the housing. As a result, different pumps with different capacities or flow rates can be used interchangeably with the same fuel filter so long as the mounting interface for the pump remains compatible with the mounting provisions of the housing and so long as the fuel inlet/fuel outlet connection remains compatible. The integration approach of the present invention also enables the use of a smaller casting for the fuel filter housing and thus there is less material and accordingly less expense as compared to the integration approach of U.S. Pat. No. 5,958,237.

In addition to the described integration approach of the present invention involving the fuel pump and the fuel filter, there are other improvements provided. The method of integrating the fuel filter lid with the filter element is one such improvement. According to the present invention, the fuel filter endplate which is integrally bonded to the filter element also functions as the closing lid for the fuel filter housing (casting). In this manner, there is an added simplicity to the design of the present invention. Further, a separate lid does not have to be provided and handled. The endplate/lid design utilizes a knob for easy removal of the "lid" and thus removal of the filter element without the need for any hand tool or special implement. Another improvement of the present invention includes the addition of an air bleed hole in order to reduce the amount of fuel vapor trapped inside of the closed fuel filter housing. Vapor trapped upon closing of the housing or generated during operation is able to bleed into a fuel return line, thereby preventing this vapor from reaching the combustion area of the engine.

The design features included as part of the present invention provide improvements to the design of the fuel filter and the integration of the fuel pump with the fuel filter and its corresponding housing. These design features are novel and unobvious advances in the art.

SUMMARY OF THE INVENTION

An integrated fuel filter and fuel pump assembly according to one embodiment of the present invention comprises a fuel filter including a fuel filter housing and a fuel filter element positioned within the fuel filter housing. The fuel filter housing has an outer surface with a connection interface defining a flow inlet and including a fuel pump mounting arrangement. The integrated assembly further includes a fuel pump which has a fuel inlet and a fuel exit and the fuel pump is constructed and arranged for connection with the fuel pump mounting arrangement whereby the fuel pump fuel exit is placed in flow connection with the flow inlet of the housing for delivery of fuel to the fuel filter.

One object of the present invention is to provide an improved fuel filter and fuel pump integrated assembly.

Related objects and advantages of the present invention will be apparent from the following description.

DESCRIPTION OF THE PREFERRED EMBODIMENTS

Figure 1:
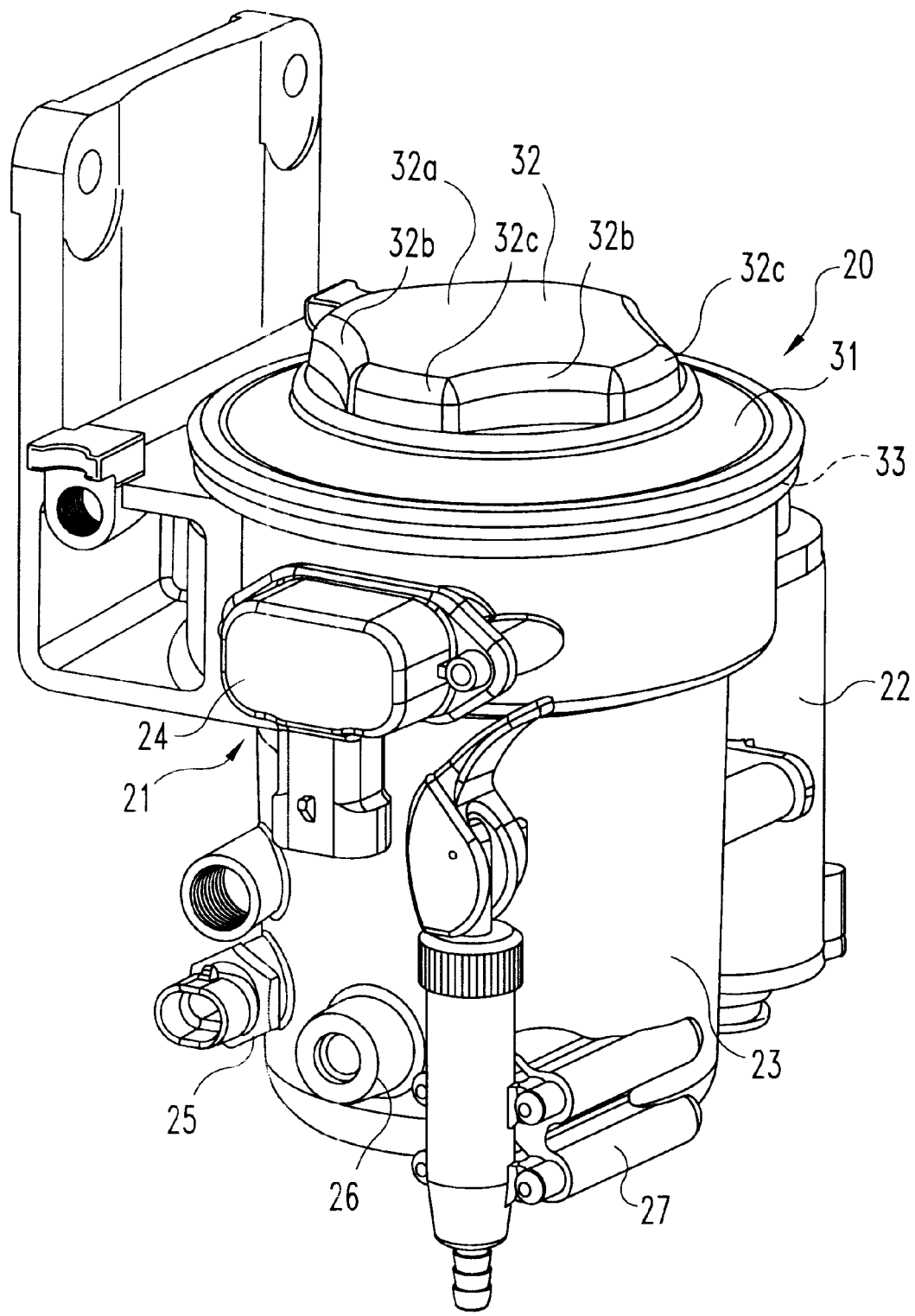
FIG. 1 is a perspective view of an integrated fuel filter and fuel pump assembly according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated an integrated assembly 20 of a fuel filter 21 and a fuel pump 22. The fuel pump 22 is attached directly to the fuel filter housing 23. Included as part of the fuel filter 21 is a heater/connector 24, a water-in-fuel sensor 25, a temperature sensor 26, and a water drain valve 27. The operation and functioning of these components is described in U.S. Pat. No. 5,855,772 which issued Jan. 15, 1999 to Miller, et al. and which patent is expressly incorporated by reference herein for its disclosure of these four components.

The interior cavity defined by the walls of the filter housing 23 is closed in part by endplate 31 which doubles as a closing lid when used in cooperation with knob 32. The endplate 31 is attached to the upper end of the filter element so as to function as a normal or traditional endplate in order to close this end of the filter from any potential fluid bypass. While the endplate 31 functions in this traditional fashion, this endplate also has an outwardly-radiating flange portion 28 with an outside diameter size which is noticeably larger than the outside diameter of the generically-cylindrical filter element (see FIG. 9), allowing the endplate 31 to also serve as a closing lid for the defined (upper) opening 33 (see FIG. 2) in the filter housing 23. The endplate 31 includes a filter-facing surface 29 and opposite thereto a knob-facing surface 30. The knob 32 is internally threaded so as to threadedly assemble onto the (upper) end of a permanent standpipe (see FIGS. 7 and 8).

Cast (or molded) as part of the filter housing 23 is a mounting bracket 34 which is used to position and secure the integrated assembly 20 in the desired location within the vehicle engine. Two clearance holes 35 and 36 are provided in order to facilitate the attachment of the mounting bracket to some selected support structure or portion of the vehicle engine by the use of threaded fasteners. Depending on the engine size and style, the mounting bracket 34 can take on whatever configuration is most appropriate as to its overall size and geometry. Likewise, the size and spacing of the mounting holes as well as the corresponding hole pattern for the two (or more) clearance holes 35 and 36 can be configured to be compatible with whatever configuration is dictated by the engine.

Figure 2:
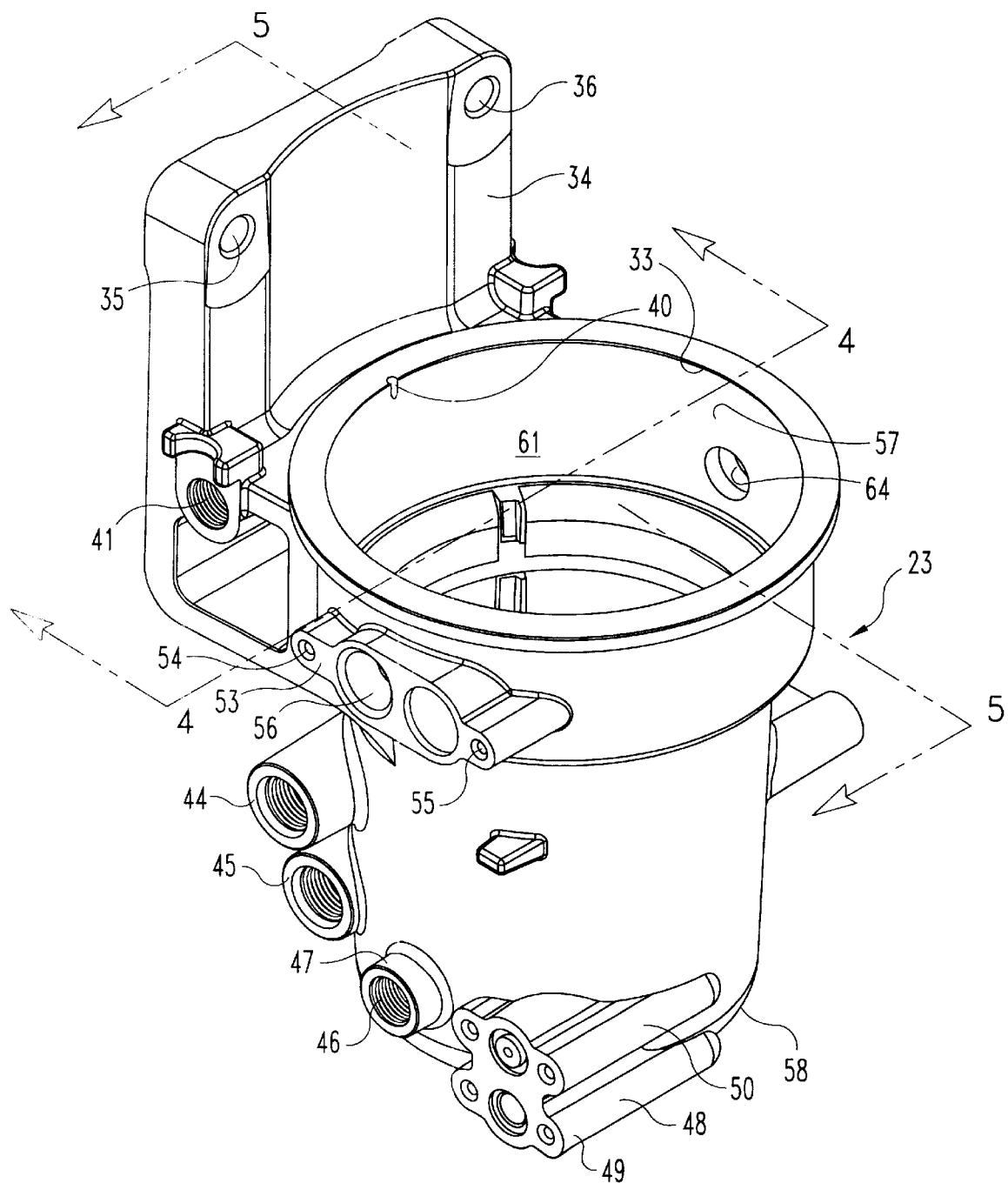
FIG. 2 is a perspective view of a fuel filter housing comprising one component of the FIG. 1 assembly according to the present invention.
Figure 3:
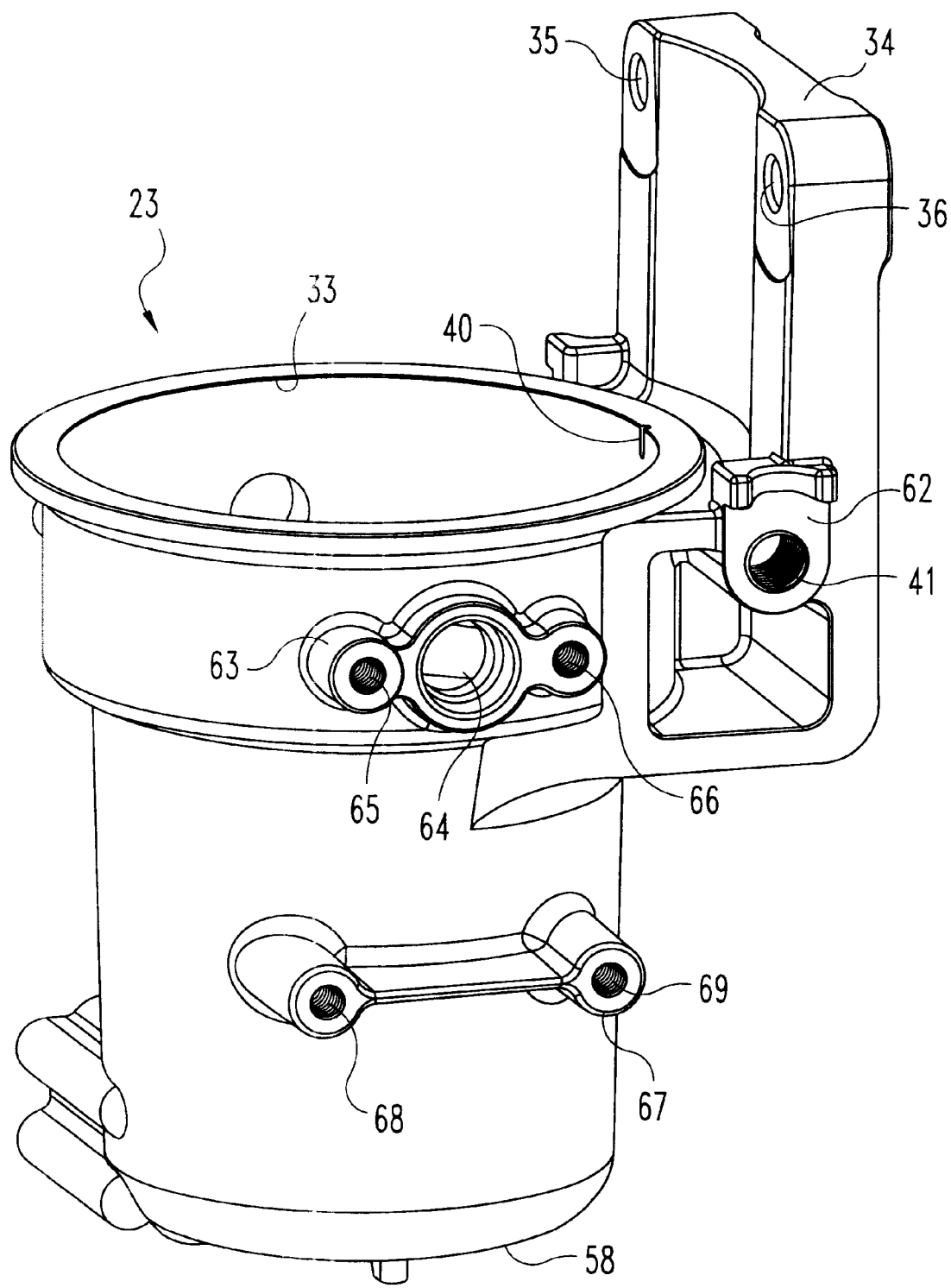
FIG. 3 is a perspective view, from a different direction, of the FIG. 2 fuel filter housing.
Figure 4:
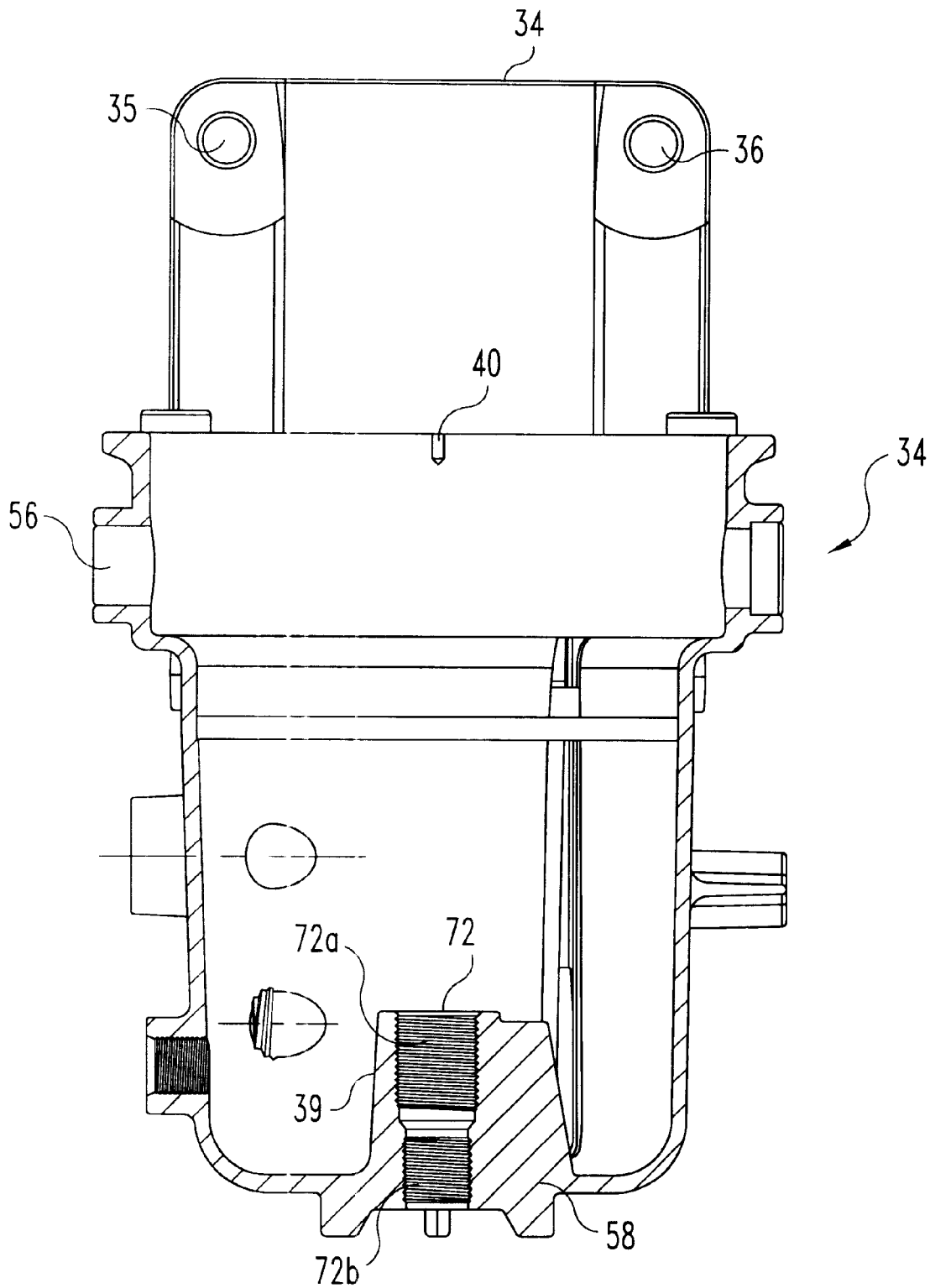
FIG. 4 is a front elevational view, in full section, of the FIG. 2 fuel filter housing as viewed along geometric cutting plane 4—4.
Figure 5:
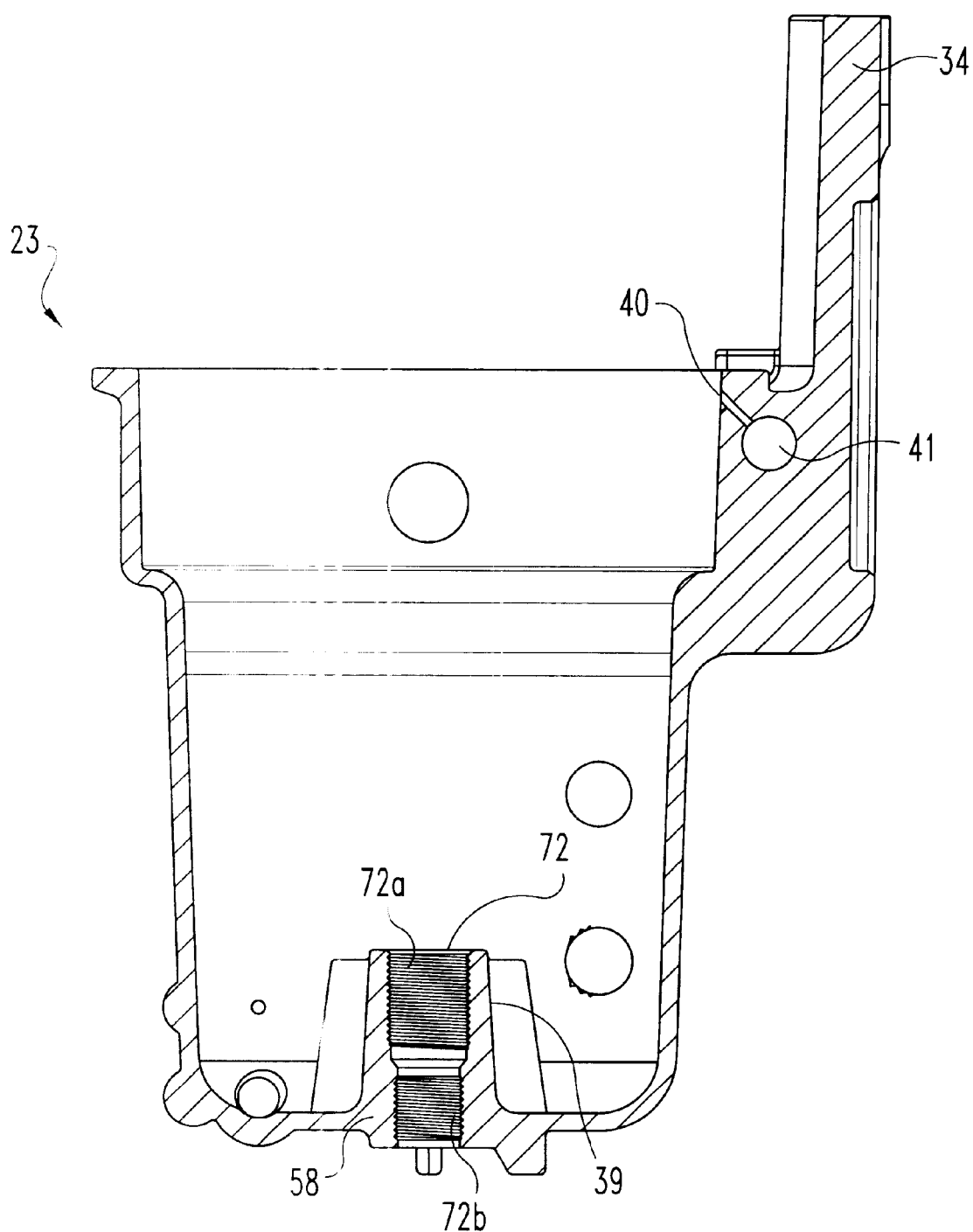
FIG. 5 is a side elevational view, in full section, of the FIG. 2 fuel filter housing as viewed along geometric cutting plane 5—5.

Referring to FIGS. 2, 3, 4, and 5, the details of filter housing 23 are illustrated. The perspective view of FIGS. 2 and 3 show virtually all of the exterior features including the mounting provisions or arrangement for the fuel pump. The full section views of FIGS. 4 and 5 show the internal features and construction of the filter housing 23 including the mounting portion 39 for the standpipe. Further illustrated as part of the FIGS. 4 and 5 section views is an air bleed hole 40 which connects to the return fuel passageway 41.

Referring first to FIG. 2, there are four, component-mounting portions included as part of the casting which provides filter housing 23. Portion 43 includes two internally threaded ports 44 and 45, either one of which may be used for the water-in-fuel sensor 25. The upper or axially higher port 44 would allow more water to accumulate before draining. The lower port 45 allows less water to accumulate before the sensor 25 is activated, thereby indicating that it is time to open the water drain valve 27. The water drain valve 27 can be operated manually or automatically by being tied into the electronics for the water-in-fuel sensor. Automatic draining with a manual back-up as well as an override provision provides the preferred coverage. The port which is not selected for receipt of the water-in-fuel sensor is simply plugged and thus becomes inactive in the operation of the integrated assembly 20.

Portion 46 is constructed and arranged for the assembly and receipt of the temperature sensor 26. Portion 46 is an internally-threaded port which includes a generally cylindrical and raised boss 47. Portion 48 is constructed and arranged for receipt of the water drain valve 27 and includes two oblong (in lateral cross section) bosses 49 and 50 which are interconnected along a common edge. Portion 53 is constructed and arranged for receipt of heater/connector 24. The oblong shape (in lateral cross section) includes two internally-threaded holes 54 and 55. Further, only hole 56 extends completely through the wall of the filter housing so as to enable communication between the heater/connector 24 and the hollow interior of the filter housing 23 as defined by the sidewall 57 and base 58.

Positioned between the hollow interior 61 of the filter housing 23 and the mounting bracket 34 is the return fuel passageway 41. This integral passageway has an internally-threaded aperture at each end for connection to a fuel line conduit at each end. Whatever fuel is being returned from the injectors or other combustion portion of the engine is designed to flow into one end of passageway 41 and out the other end which is connected to the fuel tank. This particular routing of the returning fuel enables air vapor within the closed filter housing 23 to be routed to the returning flow of fuel by way of the air bleed hole 40. Hole 40 is open to the hollow interior 61 of the filter housing 23 and is in flow connection with passageway 41 so that any trapped air vapor and any vapor which is generated during operation of the engine and use of assembly 20 is able to escape with the returning fuel (see FIG. 5).

Figure 6:
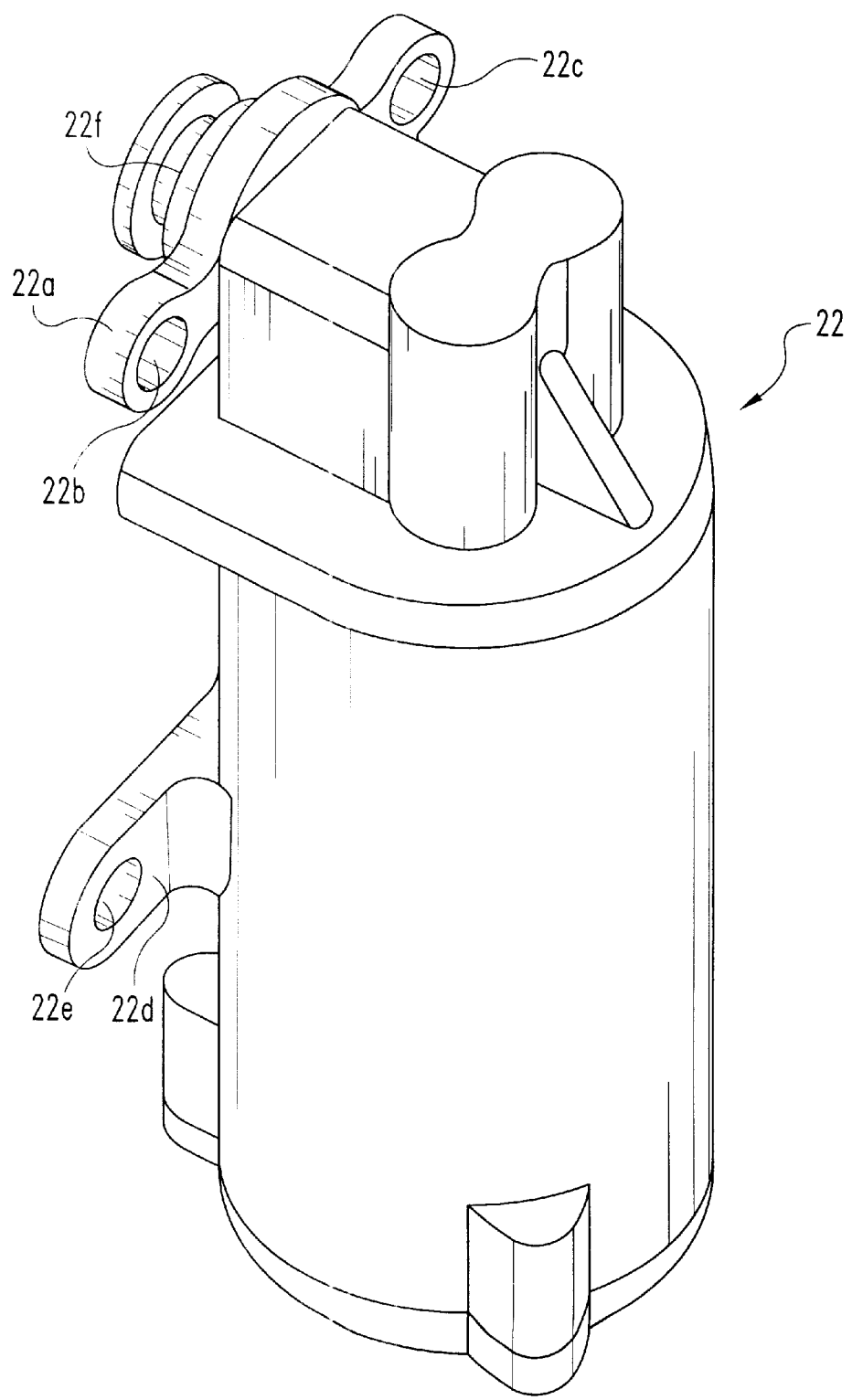
FIG. 6 is a perspective view of a fuel pump which comprises one component of the FIG. 1 assembly.

With reference to FIG. 3, the mounting provisions for the fuel pump 22 (see FIG. 6) are illustrated. Also illustrated is the other (opposite) end 62 of the return fuel passageway 41. The mounting provisions for the fuel pump 22 include a first or upper boss 63 with a through-hole 64 and two internally-threaded holes 65 and 66. Additionally, the mounting provisions include a second or lower boss 67 with two internally-threaded holes 68 and 69. It is intended that whatever fuel pump is selected, noting that various fuel pumps can be used, it will include a mounting flange 22a with clearance holes 22b and 22c of a compatible size and spacing with holes 65 and 66. Additionally, the selected fuel pump 22 shall include a second mounting flange 22d, with two clearance holes 22e being illustrated, the flange to be aligned with the second boss 67 such that the two clearance holes 22e line up with holes 68 and 69. As would be understood, threaded fasteners (four total) are used to attach the two mounting flanges 22a and 22d to the two bosses 63 and 67. A fuel delivery port 22f which is part of the fuel pump is positioned between the two clearances holes in the first mounting flange and inserts into the through hole 64. An annular, axial compression seal is used to create a liquid-tight interface so that fuel is delivered from the integrated fuel pump into the filter housing without fuel loss due to leakage. Tightening of the mounting hardware creates the requisite clamping (compression force) for the seal. A representative fuel pump 22 is illustrated in FIG. 6.

Figure 8:
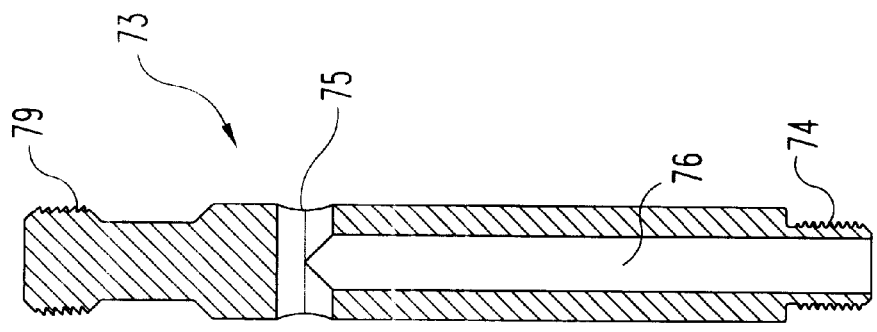
FIG. 8 is a side elevational view, in full section, of the FIG. 7 standpipe.
Figure 7:
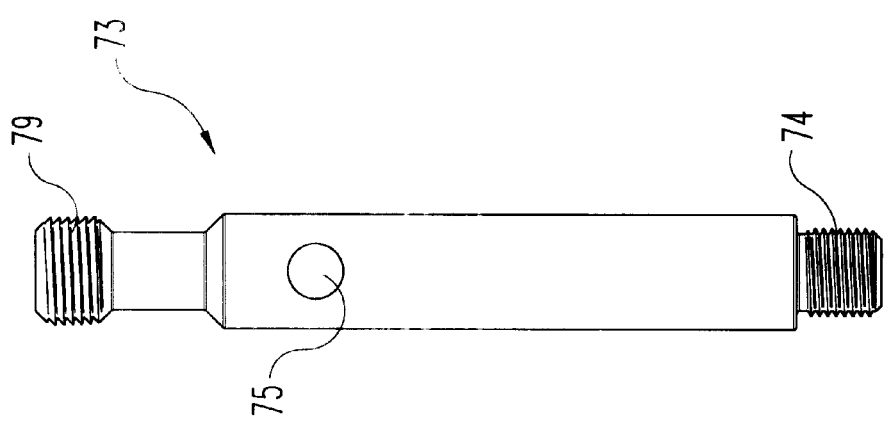
FIG. 7 is a front elevational view of a standpipe which is assembled into the FIG. 2 fuel filter housing and comprises one component of the FIG. 1 assembly according to the present invention.

With further reference to FIGS. 4 and 5, additional construction details for the filter housing 23 are illustrated. For the most part the construction details are self-explanatory based upon the descriptions already provided, the use of the same reference numerals for the same portions, and an understanding of the particular geometric cutting planes. One feature, only briefly mentioned earlier, is the use of standpipe 73 which is securely and effectively permanently assembled into the base 58 of housing 23. In order to effect this standpipe assembly into the base of the housing, an internally-threaded socket 72 is included as part of the filter housing as is illustrated in FIGS. 4 and 5. The corresponding standpipe 73 is illustrated in FIGS. 7 and 8. When the fuel filter 21 is installed in the filter housing 23, a lower edge of the fuel filter is adjacent the connection location between the standpipe 73 and base 58. The upper, opposite end 79 of the standpipe 73 extends beyond the upper, opposite end of the fuel filter and beyond endplate 31 (see FIG. 9).

Socket 72 includes two internally-threaded portions 72a and 72b. Portion 72a is constructed and arranged to receive the externally-threaded end 74 of standpipe 73. Standpipe 73 is hollow between flow passage 75 and end 74, and this conduit 76 provides for the exiting flow of fuel after being filtered. Fuel that enters the hollow center of the filter element is directed into flow hole 75 and from there, down through conduit 76 to portion 72b. Accordingly, portion 72b provides the fuel outlet port and is internally-threaded for connection to a fuel line for delivery of the fuel to the injectors.

Figure 9:
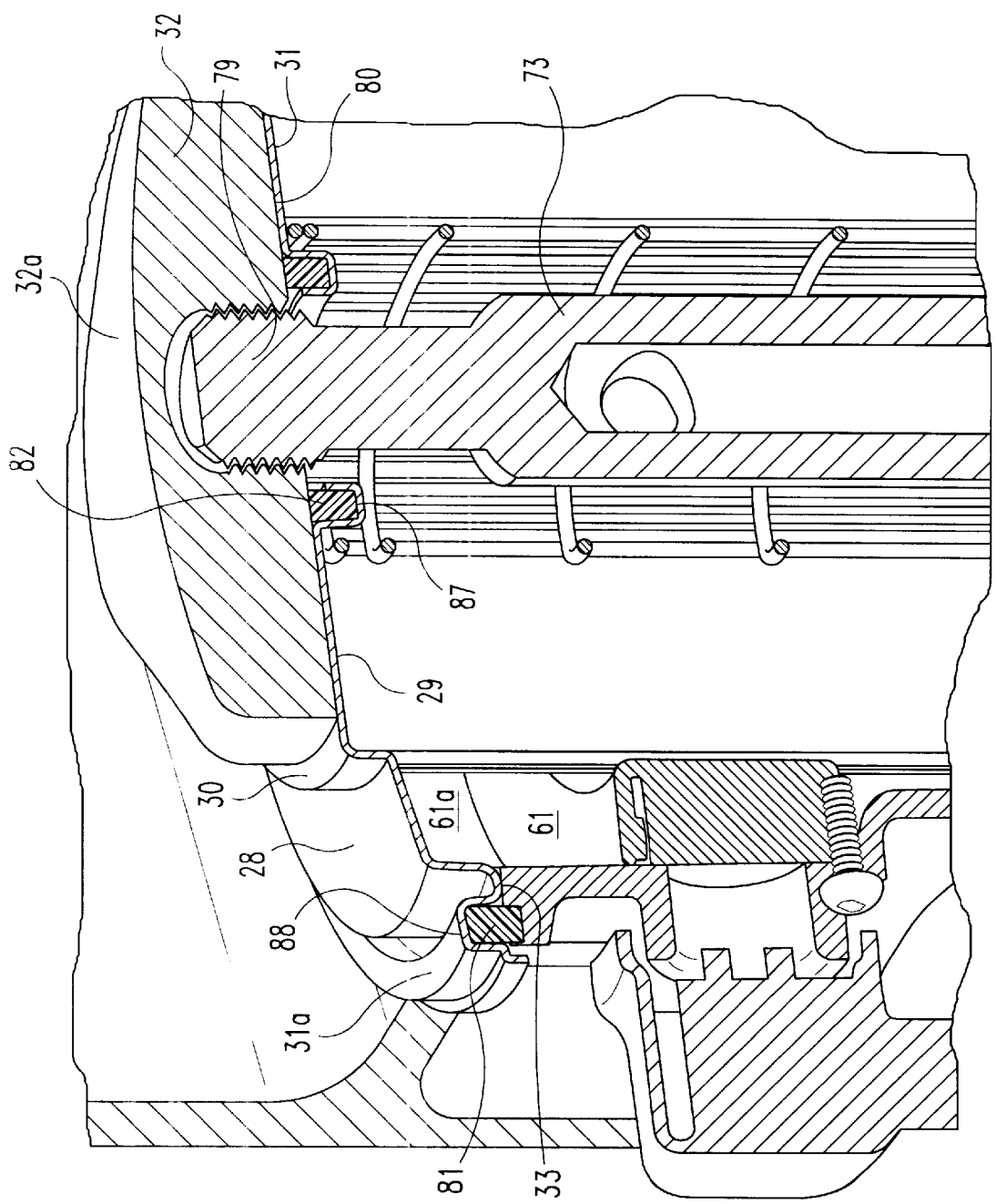
FIG. 9 is a partial perspective view, in full section, of one portion of the FIG. 1 assembly showing two primary seals and the corresponding sealed interfaces according to the present invention.

The upper end 79 of the standpipe 73 is externally threaded for connection to the closing knob 32. As will be understood, the standpipe 73 has a length which is sufficient for end 74 to be threaded into portion 72a and end 79 to extend upwardly through endplate 31 such that end 79 is exposed and thereby used for assembly of knob 32. The threaded, manual assembly of knob 32 onto end 79 pushes down on the upper surface 30 of endplate 31 by the underside surface 80 of knob 32. As this pushing force is exerted by the action of the threaded engagement of knob 32 onto end 79, the endplate 31 compresses an annular, outer axial compression seal 81 which is positioned around defined opening 33 as illustrated in FIG. 9. An inner, annular axial compression seal 82 is also axially compressed by the action of knob 32 being manually threaded onto end 79 of standpipe 73 in order to create a liquid-tight interface between the knob and the endplate.

The knob 32 is designed with an oversized head 32a which is contoured with a slightly concave portion 32b on each "side" separated by a slightly convex portion 32c at each "corner". This particular geometry for knob 32 provides an easy grip design for facilitating the manual tightening of knob 32 onto the cooperating standpipe 73 and for removal of the knob from the standpipe. The size of head 32a is also beneficial in order to facilitate the manual turning of knob 32 because with a larger radius, the turning force required to create the desired compressive torque is less than what would be needed with a smaller radius or smaller size of knob 32. Additionally, no tools are need in order to assemble the knob 32 onto or to remove the knob from the standpipe 73. This permits assembly and removal of the fuel filter relative to the housing, all by hand.

The axial compression of the inner annular seal 82 by knob 32 provides a first sealed interface between the interior of fuel filter 21 and the exterior of the fuel filter. This first sealed interface is located between the knob 32 and the upper endplate 31 and is effective to prevent liquid leakage from the interior of the filter past knob 32. The axial compression of the outer annular seal 81 by endplate 31 by means of knob 32 provides a second sealed interface between the hollow interior 61 of the filter housing 23 and the exterior of the filter housing. The second sealed interface is located between the endplate and the housing and is effective to prevent liquid leakage from the clearance space 61a past the endplate and the upper edge of the outer housing wall.

The stiffness and rigidity of endplate 31 is sufficient to transmit the force from the tightened knob 32 as it presses against the center area of the endplate from the center area to the outer edge area 31a of the endplate 31. Accordingly, the manual tightening of the knob 32 onto standpipe 73 generates a downward compressive force on the endplate which is effective to axially compress inner seal 82 as well as outer seal 81. The compression of these two seals creates the previously described first sealed interface and the previously described second sealed interface.

In order to capture the inner seal 82 and hold it in the desired location, the endplate 31 is formed with a first U-shaped, annular receiving channel 87 which opens upwardly in the direction of knob 32. The inner seal 82 which is fabricated out of an elastomeric material has a substantially rectangular shape in lateral section so as to fit snugly into the receiving channel 87. In order to capture the outer seal 81 and hold it in the desired location, the endplate 31 is formed with a second U-shaped, annular, receiving channel 88 which opens downwardly in the direction of filter housing 23. The outer seal 81 which is also fabricated out of an elastomeric material has a substantially rectangular shape in lateral section so as to fit snugly into the receiving channel 88. The axial height or thickness of each seal 81 and 82 relative to the axial height or depth of the cooperating channel is such that a portion of the seal extends beyond the edge of the channel so that there is a protruding portion of the seal material for contact and compression before the clamping components bottom out against one another.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An integrated fuel filter and fuel pump assembly comprising:
   a fuel filter including a fuel filter housing and a fuel filter element positioned within said fuel filter housing;
   said fuel filter housing having a base and an outer wall which cooperate to define a hollow interior, said outer wall having an outer surface with a connection interface and defining a flow inlet which is in flow communication with said hollow interior, said connection interface including fuel pump mounting means; and a fuel pump having a fuel inlet and a fuel exit, said fuel pump being constructed and arranged for connection with said fuel pump mounting means such that the fuel exit of said fuel pump is placed in flow connection with said flow inlet for the delivery of fuel to the hollow interior for filtering by said fuel filter.

2. The integrated fuel filter and fuel pump assembly of claim 1 which further includes a water-in-fuel sensor.

3. The integrated fuel filter and fuel pump assembly of claim 2 which further includes a water drain valve.

4. The integrated fuel filter and fuel pump assembly of claim 3 which further includes a mounting bracket for attachment of said integrated fuel filter and fuel pump assembly to a support structure.

5. The integrated fuel filter and fuel pump assembly of claim 1 wherein said integrated fuel filter and fuel pump assembly includes a standpipe which extends through the hollow interior of said fuel filter and is secured at a first end to said base, adjacent a first end of said filter, and with a second, opposite end of said standpipe extending beyond a second, opposite end of said fuel filter.

6. The integrated fuel filter and fuel pump assembly of claim 5 wherein said fuel filter includes an endplate having a filter-facing surface and an outwardly-facing surface, said filter-facing surface being positioned adjacent said second, opposite end of said filter, said endplate further including a radially-extending flange portion.

7. The integrated fuel filter and fuel pump assembly of claim 6 wherein the outer wall of said fuel filter housing includes an upper portion which defines a housing opening and said radially-extending flange portion extends outwardly from said fuel filter and is disposed in an overlaying position relative to said upper portion.

8. The integrated fuel filter and fuel pump assembly of claim 7 which further includes a first annular seal captured by said radially-extending flange portion and positioned adjacent said upper portion for providing a sealed interface.

9. The integrated fuel filter and fuel pump assembly of claim 8 which further includes a knob, means for threadedly connecting the knob to the second, opposite end of the standpipe.

10. The integrated fuel filter and fuel pump assembly of claim 9 wherein said knob includes an abutment surface which is positioned adjacent to the outwardly-facing surface of said endplate.

11. The integrated fuel filter and fuel pump assembly of claim 10 which further includes a second annular seal positioned between said endplate and said abutment surface for providing a sealed interface between said endplate and said abutment surface.

12. The integrated fuel filter and fuel pump assembly of claim 11 wherein said endplate includes an annular channel opening in the direction of said knob, said annular channel receiving said second annular seal.

13. The integrated fuel filter and fuel pump assembly of claim 12 wherein said radially-extending flange portion includes an annular channel and said first annular seal is positioned in said annular channel.

14. The integrated fuel filter and fuel pump assembly of claim 8 wherein said radially-extending flange portion includes an annular channel and said first annular seal is positioned in said annular channel.

15. The integrated fuel filter and fuel pump assembly of claim 14 which further includes a knob, means for threadedly connecting the knob to the second, opposite end of the standpipe.

16. The integrated fuel filter and fuel pump assembly of claim 15 wherein said knob having a contoured outer surface and being constructed and arranged for advancing the knob onto the standpipe in the direction of said endplate and for removing the knob from said standpipe without the need for any hand tools.

17. The integrated fuel filter and fuel pump assembly of claim 1 which further includes a standpipe assembled into said base, an endplate means for attaching the endplate to a first end of the fuel filter, a knob, and means for threadedly connecting said knob to said standpipe for threaded advancement against said endplate, a first seal positioned between said knob and said endplate and a second seal positioned between said endplate and said fuel filter housing.

18. The integrated fuel filter and fuel pump assembly of claim 1 wherein said fuel filter housing defines a return fuel passageway for connection into a return fuel conduit and further defines an air bleed aperture which is constructed and arranged to establish a flow path from said hollow interior to said return fuel passageway.

19. The integrated fuel filter and fuel pump assembly of claim 18 which further includes a water-in-fuel sensor.

20. The integrated fuel filter and fuel pump assembly of claim 19 which further includes a water drain valve.

21. The integrated fuel filter and fuel pump assembly of claim 20 which further includes a mounting bracket for attachment of said integrated fuel filter and fuel pump assembly to a support structure.

22. The integrated fuel filter and fuel pump assembly of claim 21 which further includes a standpipe assembled into said base, an endplate, means for attaching the endplate to a first end of the fuel filter, a knob, and means for threadedly connecting said knob to said standpipe for threaded advancement against said endplate, a first seal positioned between said knob and said endplate and a second seal positioned between said endplate and said fuel filter housing.

23. The integrated fuel filter and fuel pump assembly of claim 18 which further includes a standpipe assembled into said base, an endplate, means for attaching the endplate to a first end of the fuel filter, a knob, and means for threadedly connecting said knob to said standpipe for threaded advancement against said endplate, a first seal positioned between said knob and said endplate and a second seal positioned between said endplate and said fuel filter housing.

\* \* \* \* \*